June 17, 1924.
L. BLACKMORE
1,498,520
VALVE FOR INTERNAL COMBUSTION ENGINES AND METHOD OF MAKING THE SAME
Filed May 14, 1921
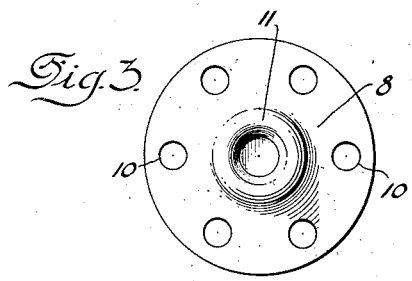
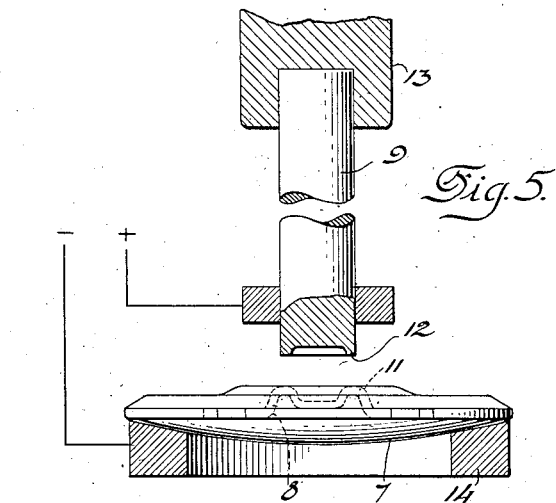
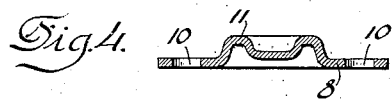
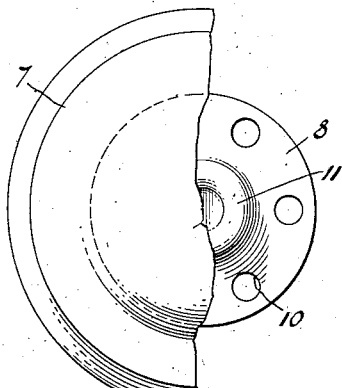
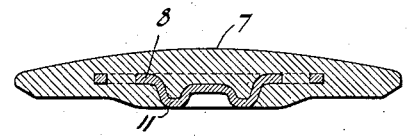
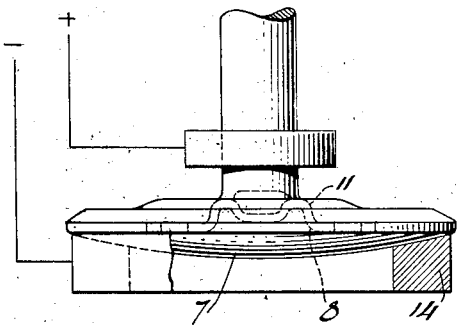
Inventor
Lloyd Blackmore Patented June 17, 1924.

1,498,520

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

VALVE FOR INTERNAL-COMBUSTION ENGINES AND METHOD OF MAKING THE SAME.

Application filed May 14, 1921. Serial No. 469,619.

*To all whom it may concern:*

Be it known that I, LLOYD BLACKMORE, a subject of the King of Great Britain, and a resident of Highland Park, county of Wayne, and State of Michigan, have invented certain new and useful Improvements in Valves for Internal-Combustion Engines and Methods of Making the Same, of which the following is a full, clear, concise, and exact description, such as will enable others skilled in the art to which the invention relates to make and use the same, reference being made therein to the accompanying drawings, which form a part of this specification.

My invention relates to valves of the type or class commonly referred to as poppet valves, and particularly to poppet valves designed with special reference for use with internal combustion engines wherein they will be subjected to abnormally high temperature; although valves made in accordance with my invention may be used in other devices wherein poppet valves are employed as there is nothing about them limiting them in their use, to use with internal combustion engines.

The objects of my invention are to provide an improved poppet valve wherein the stem and head are made separate from one another, and are welded together to complete the valve; to provide a valve wherein the head is made of cast metal having a strengthening member embedded therein, and to which the stem of the valve is welded; to provide a valve which will be simple in construction and which may be manufactured at small cost; and to otherwise improve valves of the type or class to which my invention relates.

With the above and other objects of invention in view my invention consists in the improved poppet valve illustrated in the accompanying drawing and hereinafter described in detail, and finally claimed; and in such modifications and variations thereof, within the scope of the concluding claims, as will be obvious to those skilled in the art to which my invention relates.

In the drawing accompanying and forming a part of this specification and wherein the preferred embodiment of my invention is illustrated:

Figure 1 is a fragmentary view showing the head of my improved valve as seen from the under side thereof and broken away in part to show the strengthening member embedded therein.

Figure 2 is a view showing a section of the head upon a central plane.

Figure 3 is a view similar to Figure 1 but showing a wrought metal insert which is embedded in the head of my improved valve, by itself and apart from the head.

Figure 4 is a view showing the insert of Figure 3 in section.

Figures 5 and 6 are views illustrating the welding step whereby the stem and head are welded together, in the manufacture of my improved poppet valve.

Referring to the drawing, the head of my improved valve is made up of a cast metal body portion 7 within which a metal insert 8, made commonly from a disc of wrought iron or low carbon steel, is embedded as the valve head is cast; said insert serving the double purpose of strengthening the valve head and providing an element to which the stem 9 of the valve, which is ordinarily made from low carbon steel or steel having a composition especially adapting it for use in making valve stems for internal combustion engines, may be welded with facility and with the maximum of certainty of securing a perfect and lasting union between the parts. This method of construction provides a valve in which the seating surface is made from cast metal such as cast iron, which has been found to be a material especially well adapted for use in poppet valves; a valve in which the stem may be made from wrought iron or special alloy steel in order to secure the requisite strength and non-breaking qualities necessary in valve stems; a valve in which a good weld and a lasting joint may be more surely secured between the head and stem; and provides a valve in which should the valve head become broken, as often happens, the parts thereof will be held together by the embedded insert and cannot find their way into the cylinder of the engine.

The insert 8 is preferably made from a comparatively thin wrought iron disk cut from a sheet or plate of the requisite thickness and which disc is preferably provided with holes 10 in order to secure a more satisfactory embedding of the same in the head as the molten metal to form the head is poured into a mold cavity in which the insert is properly supported. The metal of the disc during the formation thereof is preferably upset to provide a comparatively narrow annular ridge 11 the highest part of which lies substantially in the plane of the under side of the head after the strengthening member has been embedded therein, and the end of the valve stem which is welded to the disc is preferably cup-shaped to provide a narrow annular ridge 12 which contacts with the ridge 11 when the stem is welded to the head, to thereby localize the heating effect of the welding current and secure a more perfect joint between the parts; said joint being annular in form because of the form of the meeting surfaces of the stem and insert, as will be appreciated.

The welding of the stem 9 to the head is done by a suitable welding machine, shown conventionally only, having a plunger 13 and a support 14 movable toward one another to press the end of the stem against the ridge 11 of the insert; a welding current being caused to flow through the parts simultaneously with the forcing of them together in accordance with well known electrical welding processes.

It will be appreciated that the steps above referred to whereby my improved valve is produced constitute a method or process for the production of valves of the type in question, and, in addition to the features of the valve itself hereinbefore referred to, my invention includes the method or process whereby the same is produced; the purpose and intent of this applicant being to secure a patent both for the valve itself and for the method or process whereby the same is produced.

Having thus described and explained my invention, I claim and desire to secure by Letters Patent:

1. An improved poppet valve comprising a cast metal head, a metallic insert embedded in said head, and a stem welded to said insert.

2. An improved poppet valve comprising a cast metal head, a wrought metal insert embedded in said head, and a stem welded to said insert along an annular joint between the parts.

3. An improved poppet valve comprising a cast metal head, a wrought metal insert embedded in said head and having an annular ridge, and a stem welded to said insert along said annular ridge.

4. An improved poppet valve comprising a cast metal head, a wrought metal insert embedded in said head and having an offset or raised central portion, and a stem welded to the raised portion of said insert.

5. An improved poppet valve comprising a cast metal head, a wrought metal insert embedded in said head and having an annular ridge terminating substantially in the plane of the under side of the valve head, and a valve stem having an annular ridge in contact with and welded to the ridge aforesaid of said wrought metal insert.

In testimony whereof I affix my signature.

LLOYD BLACKMORE.